May 28, 1940. H. R. OWEN 2,202,397
UNITARY LUMINOUS DISPLAY
Filed July 18, 1938 3 Sheets-Sheet 2
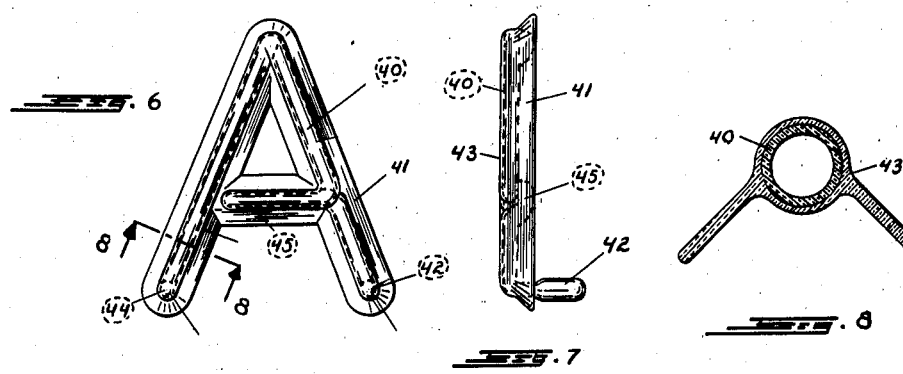
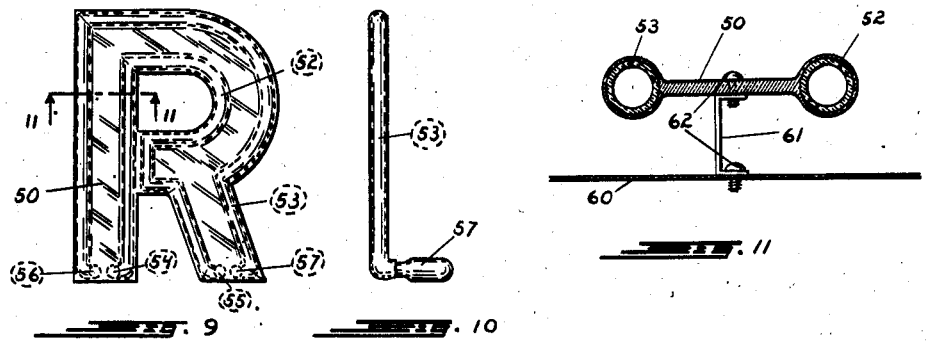
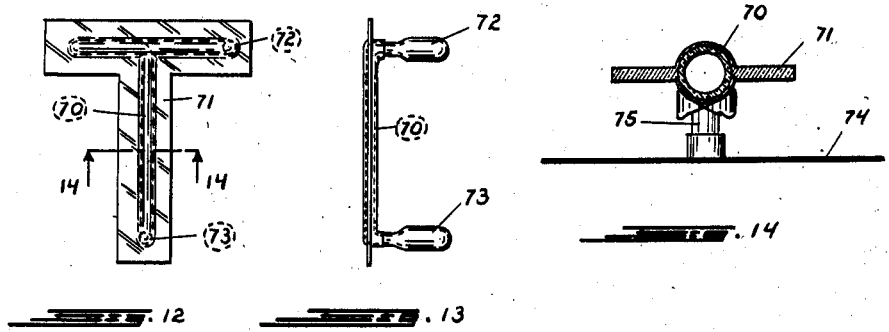
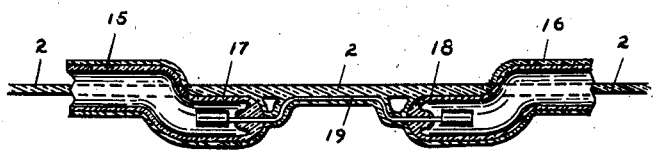
INVENTOR May 28, 1940. H. R. OWEN 2,202,397
UNITARY LUMINOUS DISPLAY
Filed July 18, 1938  3 Sheets-Sheet 3

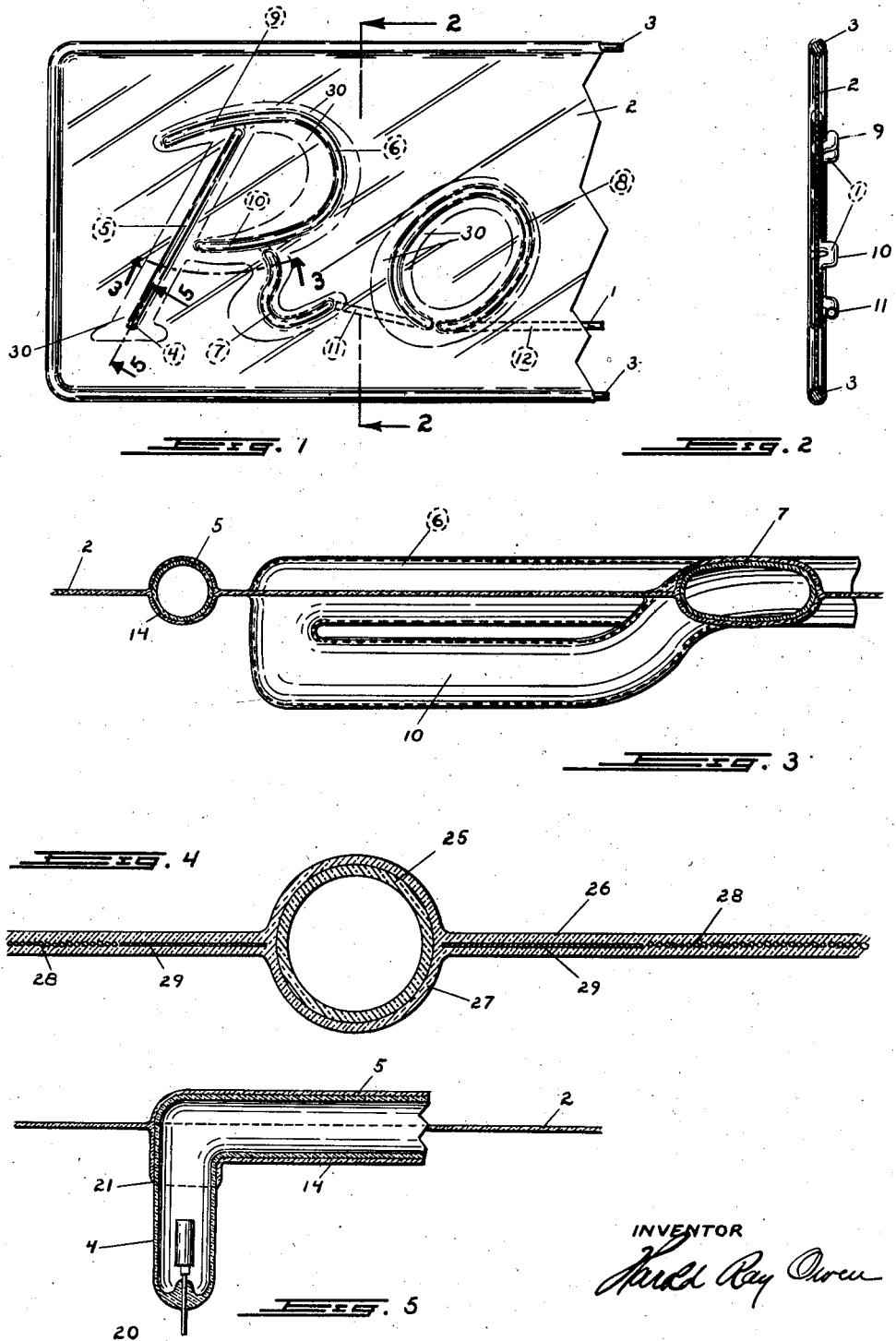

INVENTOR
Harold Ray Owen

Patented May 28, 1940

2,202,397

UNITED STATES PATENT OFFICE 2,202,397

UNITARY LUMINOUS DISPLAY

Harold Ray Owen, Los Angeles, Calif., assignor to Electrical Products Corporation, Los Angeles, Calif., a corporation of California Application July 18, 1938, Serial No. 219,788

6 Claims. (Cl. 40—130)

This invention relates to unitary luminous displays in which gaseous conduction lighting tubes, descriptive of the displays, are embodied as parts of unitary structures in background or body sheetings of plastic material, which material in the preferred forms of the invention, extends around the tubes as protective sheathings for the same. In general it is directed to the production at low cost of simple and durable display devices capable of embodiment in a variety of forms with new and novel lighting effects and highly attractive background finishes impracticable of production by ordinary methods.

One object of the invention is to provide display units in which the tubes are completely supported and protected, mechanically and electrically, presenting terminal connections to the feed wiring, in condition ready for installation. When two or more tubes are included in a unit the connections between the tubes are formed as part of the unit and may be embedded in the plastic material of the sheeting.

Another object of the invention is to produce display units which may be readily repaired in the event of tube failure. The units to be repaired are processed to dissolve the plastic away from the tubes to leave them in condition to be handled in the usual manner in the glass room. After repairs are completed the tubes are again fabricated with plastic material into complete units by the original process. This work may be carried out with such facility and at such low cost that, giving consideration to the greatly lowered probability of tube failure with these devices, the maintenance cost is very low.

In this connection it is a further object of the invention to reduce the probability of tube failure by rendering the tube shatterproof. This is accomplished, in the preferred embodiments of the invention, by extending the plastic material of the backgrounds as sheathing around the tubes. This feature, in its broadest implications, is described and claimed in my copending application, Serial No. 217,109, filed July 1, 1938. As explained therein, gaseous conduction tubes may be strengthened to a surprising degree by the application of plastic coatings which shrink and apply compression to the tube walls. As applied to the instant invention, this feature may be carried out in different fashions as described below without causing shrinkage of the background sheeting.

However, in certain embodiments of the invention, it is a particular object of the invention to provide for the tautening of the background sheeting by utilizing plastic which takes a final set in shrinkage, there being in such cases, special frameworks provided in the structure to resist the shrinkage and prevent distortion. In such constructions, the same plastic may be used for sheathing the tubes and forming the backgrounds. Quite large background structures, may be thus constructed of relatively thin material without danger of tube breakage in spite of much rough handling.

A further object is to provide for the construction of displays, exemplified by electric signs, in which portions of the tubing non-descriptive of the displays are concealed by the background sheeting, the portions exposed being in clean cut representation of the desired designs or characters. When two or more tubes are fabricated into a single unit, the cross connections between the tubes are similarly concealed.

It is a further object of the invention to produce, at very low cost, brilliant and durable background finishes by embedding in the background sheeting decorative materials which show through the plastic in designs. Numerous attractive materials which are not adapted to use in displays exposed to the weather may be thus used in my devices to produce permanent finishes. Smalt finishes, which are much desired and frequently used on outside signs, tend to accumulate dirt and lose their original finish. With my devices the granulated particles are completely protected from the weather and from dirt and the background presents a smooth finish which can be easily cleaned. Such materials as flitters, granulated colored glasses and fluorescent powders which are generally unsuited for exposed finishes may be used with entire satisfaction. Metallic leaf, foil, foil papers, engraved and embossed papers and the like are available in endless variety on the market and may be used with my backgrounds without regards to their mechanical weakness of tendency to dull in exposure to the air.

A further object of the invention is to take advantage of side radiation from the tubes to produce illuminated effects over the backgrounds in addition to the directly viewed light of the tubes. The tubes form continuous optical units with the background plastic, which by suitable construction, may be taken advantage of to produce attractive lighting over the display face. Light rays passing from the glowing gas columns of the tubes edgewise into the sheathing are reflected back and forth between the opposing surfaces thereof until reflected out of the structure by the finish material.

Another object of the invention, in certain special embodiments thereof is to produce unitary sign characters and the like in which character tubes are combined with plastic webbing descriptive of the characters. Units so constructed may be produced either with shrinking plastic or otherwise. When the webbing extends a short distance from the tube on either side or between two tubes or tube branches closely spaced no special provision need be made against distortion of the webbing. With these units the webbing will in general be much thicker than with the extended backgrounds of signs, thereby facilitating the use of the shrinkage feature for strengthening the tubes.

Further objects of the invention will be apparent from the following specification taken in view of the accompanying drawings.

By way of exemplification, but not by way of limitation, the invention is illustrated as embodied in electric signs and electric sign character units. It may however, be applied as well in the construction of lighting fixtures and other types of lighting devices. It is to be understood that the claims are to be read broadly as including all types of lighting devices embraced by the terms thereof, the invention thereby defined being subject to broad modifications of the new combinations herein disclosed.

In the drawings, the same reference numeral appearing in more than one view is to be understood as having reference to the same or the equivalent part throughout.

Figure 1 is a front elevation of a section of a sign unit made here according having a single gaseous conduction tube traversing the outlines of a series of characters and having a supporting frame fabricated into the structure. Figure 2 is a side view of the sign section as shown by the section line 2—2 in Figure 1. Figure 3 is a sectional view taken as indicated by the section line 3—3 illustrating the backset arrangement of certain portions of the tubing.

Figure 4 is a typical cross section, much enlarged, through a portion of a sign having granular particles and decorative sheet elements embedded in the background sheeting.

Figure 5 is a sectional view through an electrode terminal taken as indicated by the section line 5—5 in Figure 1.

Figure 6 is a front elevation of an individual sign character of a raised bevel type made according to this invention. Figure 7 is a side elevation of the same. Figure 8 is a cross section of the same taken as indicated by the section line 8—8 in Figure 6.

Figure 9 is a front elevation of an individual character having two tubes, preferably of differing and contrasting colors, sealed in a plastic body designed to become lighted by rays from the tubes passing through the sheeting. Figure 10 is a side elevation of the same showing the electrode terminal arrangement. Figure 11 is a cross section of a letter stroke of the same taken as indicated by the section line 11—11 in Figure 9 and showing in addition the detail of the mounting of the letter on a background of a sign.

Figure 12 is a front elevation of another type of individual character constructed with a single tube. Figure 13 is a side elevation of the same. Figure 14 is a cross section of the same taken as indicated by the section line 14—14 in Figure 12 and showing in addition the detail of the mounting of the letter on a background of a sign.

Figure 15 is a sectional view along the axes of two tubes connected together in series in a unitary structure, shown as an alternative to the single continuous tube of Figure 1.

Figure 16:
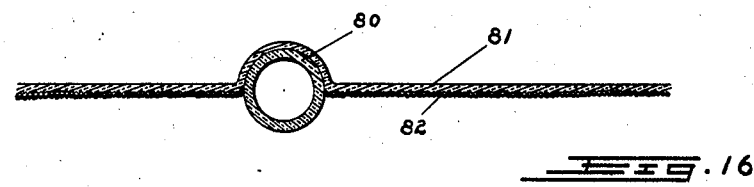

Figure 16 is a cross section through a portion of a sign or like structure in which the tubing is only partially sheathed by the plastic material of the background sheeting.

Figure 17:
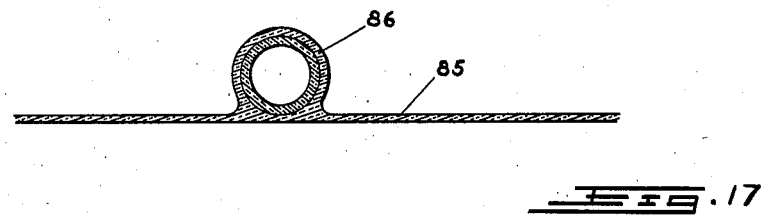

Figure 17 is a cross section through another modification of luminous structure in which the tubing is positioned forward or backward of the plane of the background sheeting.

Figure 18:
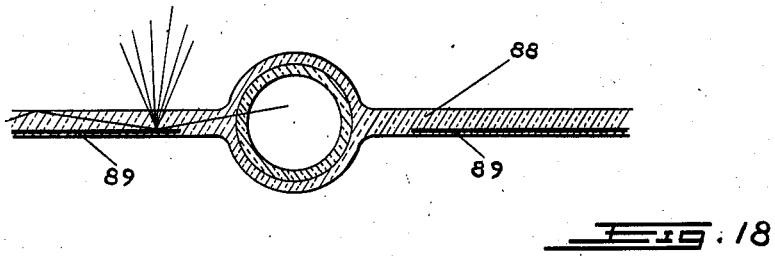

Figure 18 is a diagrammatic illustration of the projection of light rays from the tubing through the sheeting to illuminate the same. It is shown in exaggerated proportion as a cross section through a portion of a sign. The effect herein shown takes place to some degree with all constructions of the invention in which the plastic is light transmissive.

In the drawings I have shown various types of signs and sign character units in which luminous tubes are fabricated into background structures of plastic. The backgrounds may be extended or in the form of character strokes associated with the tube formation. Sheet backgrounds may be lax or in tension, the tension structures usually having supporting frames.

The sign shown in Figure 1 and associated views has an extended background sheeting, indicated by numeral 2, and a supporting frame 3. The gaseous conduction tube 1 is formed to follow the outlines of a series of characters with the descriptive portions of the tube, such as 5, 6, 7 and 8, occurring in a common plane which may be taken as the plane of the background. Non-descriptive portions of the tubing, such as the return bends indicated at 9 and 10 and the cross overs at 11 and 12, are backset from and concealed by the background. The arrangement of the backsets may be seen in the sectional view of Figure 2. The return bend arrangement at 10 is shown in enlarged scale in Figure 3. In this view the sheeting is shown to be relatively thin as is typical of tautened backgrounds. The plastic material extends around the tubing as a sheathing 14. This sheathing may optionally and preferably cover the backsets as well as shown.

The terminal electrodes may be constructed in the manner shown in Figure 5. The electrode proper 4 extends backward a sufficient distance to provide the usual clearance to ground for high voltage wires extending to the lead wire 20 from the current supply. The sheathing may cover the electrode or end at some point short of the lead wire such as indicated by 21. Various modifications are permissible on the details of the terminals.

Instead of a single tube traversing the outlines of the characters, a series of tubes may be used and connections such as that shown in Figure 15 made between them. In that view two tubes 15 and 16 have electrodes 17 and 18 backset from the background 2 and connected together by the jumper wire 19 embedded in the material of the background for mechanical and electrical protection. This detail may be taken as typical of one modification of the terminal 4 in which the supply wires may be carried to the tubing along the background sheeting.

A suitable method of fabricating these signs is disclosed in my copending application, Serial No. 219,797, filed July 18, 1938. According to that method, tubing preformed as desired, is embedded in masking bodies to expose certain portions of an application of plastic which extends over adjacent surfaces of the mask to become background sheeting. When tautened backgrounds are to be produced, frameworks are positioned on the mask and the plastic extends over to include the frameworks in the signs thus formed. The plastic may shrink as it dries, or it may be caused to shrink at some later time by special treatment. The first application is usually followed up by a backing coating by removing the work from the mask and spraying or otherwise coating the rear sections of the tubing and the rear of the background. The tubing being completely sheathed, is thus placed under compression as the plastic sets. As explained in my copending application, Serial 217,109, this greatly increases the strength of the tubing so that there is no danger of breakage from the springing of the relatively thin sheeting shown in Figure 3. As a matter of fact, the tubing thus strengthened can be conuted on to strengthen the sign, the framework being employed mainly to prevent distortion and provide for mounting the sign.

A plastic material known under the trade name of "Nycon" and manufactured by American Plastics Corp., Richmond, Calif., is suitable for this purpose.

The plastic should be light transmissive over the front of the tube. Various background finishes may be used, but very effective and economical finishes may be had according to my masking process by embedding decorative material in the sheet to show through as the design. The masks may be of solid material or granular material or even of liquid. The materials to be embedded in the sheeting are positioned on the surface of the mask and become attached to the plastic layer. With granular masks the top layer of grains serves as the decorative enclosure of the sheet. Various effects may be produced by multi-colored sands or the like stenciled on the mask surface before coating with plastic. Decorative sheets cut to the shape of elements of the desired design may also be used with granular masks. With solid masks the decorative layer serves as the parting. Any decorative materials may be used with liquid masks which float with dry exposed surfaces on the liquid.

The cross section of Figure 4 may be taken as typical of displays constructed with granular and sheet enclosures. The view is much exaggerated in size and in some proportions for purposes of clarity. The tube, here indicated by 25, has been fabricated into the background sheeting 26, the material of the sheeting extending around the tube as a sheathing 27. Sheet members 29 having been positioned on the surface of a granular mask, have been caught and included in the sheet together with a layer of grains 28 at the places not covered by the sheets. A backing coating of plastic has completely sealed the decorative members. Obviously the plastic should be light transmitting over the front surface of the display although this is not necessary over the back surface.

As compared with Figure 1, the sheet members 29 would correspond to the character strokes as indicated by 30, 30, etc. The background proper would correspond to the granular enclosures 28.

The most satisfactory method of depositing the plastic in mask moulding is by means of the spray gun although other methods may be used within the purview of this invention. In general it is preferable to coat the back of the first deposited layer, the backs of the descriptive portions of the tubing and the backsets. However, for some purposes the displays may be constructed as typified by the cross section in Figure 16. In this view the tube 80 is only partially covered by the plastic of the background 81. The layer of decorative material 82 has been left exposed as well. In this construction the front of the display would preferably be the upper part of the section as shown.

While in general it is preferable to construct displays with the background sheeting in a plane passing near the center line of the tubing, this invention may be practiced in the manner typified by the cross section of Figure 17. In this view the sheeting 85 is offset from the tube either to the front or the back but is integral with the sheathing 86 which completely covers the tube.

Signs and other types of displays may be produced having tension coatings covering the tubing formed integral with lax backgrounds. This may be done by first spraying the tubing with shrinking plastic and then forming the background by the mask method. Cellulose acetate and cellulose nitrate are characterized by shrinkage as the solvents pass off. Vinyl acetate with an admixture of a plasticizer such as tricresyl phosphate or dibutyl phthalate is suitable material for background sheeting when shrinkage is not desired. With displays of considerable size the preference is for thin background tautened by shrinking and held by boundary frames which also serve as convenient mounting supports. For individual characters and lighting fixtures the preference is for thick backgrounds which may or may not be shrunk.

Another important feature of the invention depends in some measure on the background thickness. In the diagram of Figure 18 I show the manner in which light rays from the glowing gas column of the tube are entrapped between opposing surfaces of the sheeting and serve to illuminate the enclosures. The sheeting, here indicated by 88, is of considerable thickness, being proportionate to the thickness of glass plates used in edge lighted neon signs. The enclosed sheet members 89 have been shown positioned close to the rear surface of the sheeting. If these members be of bright foil a certain amount of light will be reflected along from their surfaces and a certain amount will be reflected out of the sheeting at each point thus producing a lighting effect through the sheeting for a considerable distance from the tubing. This feature of the invention may be taken advantage of to different degrees with different types of decorative enclosures and different thickness of sheetings.

This feature is of particular utility in connection with individual characters such as those shown in Figures 6, 9, and 12 and associated views. In the character shown in front and side elevations in Figures 6 and 7, the tube 40 has been fabricated into the plastic character 41. The character is of the raised type with the tube positioned at the apex of the beveled sides. The return bend of the tube 45 is concealed by the letter. The electrode terminals 42 and 44 turn backward in the usual manner for insertion into terminal housings. The plastic material forms a complete sheathing around the tube as indicated by 43 in the cross section of Figure 8.

From this view may be readily observed the advantageous application of light from the tube to illuminate the sides of the letters.

In the character shown in Figure 9 two tubes, 52 and 53, are sealed in the character sheeting 50. The tubes may be of different color quality and serve to produce a blending of colors through the sheeting. As shown by the side elevation the electrode terminals turn backward in the usual manner. Since two tubes are used, there are four electrodes, 54 and 55 for the one tube and 56 and 57 for the other. A single tube may, of course be used alternatively in the same manner. One suitable manner of mounting this letter from a sign body is shown in the cross section of Figure 11. Metal stands such as 61 are secured by sheet metal screws to the background 60. The letter is secured to the stands by similar screws.

The character shown in Figures 12 and 13 has the tube 70 sealed in the character sheeting 71. The electrode terminals 72 and 73 are typical. In the cross section of Figure 14 the character is shown mounted from the sign body 74 by means of the common insulating stand 75 to which the tube is wired.

The term "plastic" is used herein in the generic sense as including all substances which are non-shatterable under ordinary conditions of use and ordinary temperatures. Usually they are applied from a soft or a liquid state to set as solids having the desired characteristics, although as this invention is concerned the term is not so limited in its implications.

The term "gaseous conduction tubing" embraces illuminating devices of all types comprising elongated tubular bodies charged with fluid, vapor or gas and caused to become luminous by the application of electric energy thereto.

Having thus described my invention, what I claim is:

1. A plastic sheathed, gaseous conduction lighting tube, convoluted together with its sheathing in the form of a design, and a plastic webbing of thickness materially less than the width of said tube, integral with the sheathing thereof, extending along a plane passing through the various convolutions of said tube and forming a mechanical support and display background for the same.

2. A plastic sheathed, gaseous conduction lighting tube, convoluted together with its sheathing in a pattern in which a plurality of sections lying in a common plane together represent a desired design and other connecting but non-descriptive sections are backset from said plane, and a plastic webbing of thickness materially less than the width of said tube, integral with the sheathing thereof, extending along a plane passing through the various convolutions properly representative of said design and forming a mechanical support and display background for the same while concealing said non-descriptive sections of said tube.

3. A plastic sheathed, gaseous conduction lighting tube, convoluted together with its sheathing in the form of a design, a plastic webbing extending along a plane passing through the various convolutions of said tube, integral with the sheathing thereof and forming a display background for said tube, said webbing being of such thinness as to be incapable of supporting said tube unless tensioned, and frame means to maintain said webbing in tension to provide a mechanical support for said tube.

4. A plastic sheathed, gaseous conduction lighting tube, convoluted together with its sheathing in a pattern in which a plurality of sections lying in a common plane represent a desired design and other connecting but non-descriptive sections are backset from said plane, and a plastic webbing extending along a plane passing through the various convolutions of said tube properly representative of said design, integral with the sheathing thereof, and forming a background for the same, said webbing being of such thinness as to be incapable of supporting said tube unless tensioned, and frame means to maintain said webbing in tension to provide a mechanical support for said tube.

5. A plastic sheathed, gaseous conduction lighting tube, convoluted together with its sheathing in a design, said sheathing being under tension and of such thickness as to apply compression to the walls of said tube to a degree sufficient to strengthen the same, and a plastic webbing of thickness materially less than the width of said tube, integral with the sheathing thereof, extending along a plane passing through the various convolutions thereof and forming a mechanical support and display background for the same.

6. A plastic sheathed, gaseous conduction lighting tube, convoluted together with its sheathing in a pattern in which a plurality of sections lying in a common plane represent a desired design and other connecting but non-descriptive sections are backset from said plane, said sheathing being under tension and of such thickness as to apply compression to the walls of said tube to a degree sufficient to strengthen the same, and a plastic webbing extending along a plane passing through the various convolutions of said tube properly representative of said design, integral with the sheathing thereof, and forming a background for the same while concealing said backset sections of tube, said webbing being of such thinness as to be incapable of supporting said tube unless tensioned, and frame means to maintain said webbing in tension to provide a mechanical support for said tube.

HAROLD RAY OWEN.